A. P. Brown.
Wind Wheel.
No. 4,169. Reissued Oct. 25, 1870.
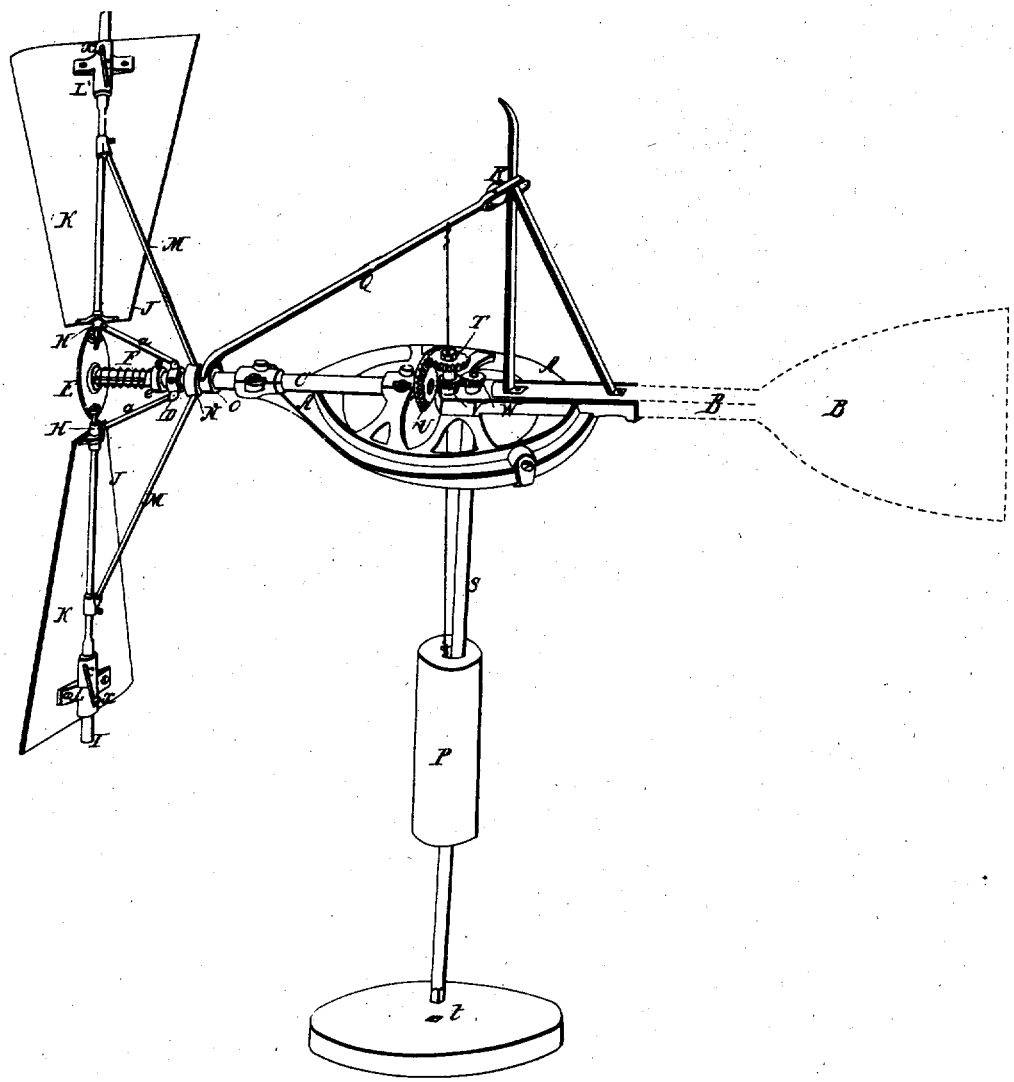
Witnesses:
Wm K Pierson
Edward C Rechill
Inventor:
A. P. Brown

UNITED STATES PATENT OFFICE.

THE CONTINENTAL WINDMILL COMPANY, OF NEW YORK, N. Y., ASSIGNEES OF ADDISON P. BROWN.

IMPROVEMENT IN SELF-REGULATING WINDMILLS.

*Specification forming part of Letters Patent No.* 13,156, *dated July* 3, 1855; *extended seven years; reissue No.* 4,169, *dated October* 25, 1870.

*To all whom it may concern:*

Be it known that I, ADDISON P. BROWN, of the city, county, and State of New York, have invented certain new and useful Improvements in Windmills; and that the following is a full, clear, and exact description thereof, reference being had to the accompanying drawings, making part of this specification.

Prior to my said invention devices had been constructed designed for regulating the velocity of windmills under varying pressures of wind. Some depended upon the increased velocity of the wind-wheel alone, and others upon the increased pressure of the wind. The only result attained by the one class was to prevent the velocity from becoming excessively injurious, and in the other to prevent injury to the machinery by excessive pressure on the sail-surface; but by neither of the two methods alone could an approximation to a uniform velocity be attained.

The object of my said invention was by a combination of mechanism to obtain a windmill which would vary but slightly in velocity, whatever might be the force of the wind; and that result I obtained by a combination of two mechanisms, by the first of which the increased pressure of the wind against the sails increases the inclination of their surfaces to the plane of motion of the wind-wheel so as to reduce the area of sail-surface presented to the direct action of the wind, and, second, by so connecting weights with the wind-wheel that by the centrifugal action due to such increased velocity the angle of the surface of the sails to the plane of motion of the wind-wheel shall be increased beyond what would be effected by the direct pressure of the wind alone. By such combination of the two forces I am enabled more effectually to regulate the velocity of windmills than by any other known means.

In the accompanying drawings, A represents the turn-table, which is to be suitably mounted on a frame, so that it can be turned thereon by a vane, B, as is well known to persons skilled in this branch of the arts.

The shaft C of the wind-wheel is mounted in suitable boxes on this turn-table; and on its inner end it has a bevel cog-wheel, U, which engages another bevel cog-wheel, T, the hollow arbor of which is fitted to turn freely on a vertical stud in the center of the turn table, and on the arbor of the bevel-wheel T there is a spur-wheel, V, which engages another spur-wheel, W, on the upper end of a nearly vertical shaft, S, the lower end of which is connected by any suitable universal joint with a pulley, *t*, or other suitable device for communicating back motion to machinery.

By this arrangement of gearing, all tendency to turn the turn-table by the turning of the wind-wheel is prevented, for it will be seen that if the horizontal bevel-wheel T was on the vertical shaft for driving machinery connected with it, the resistance to the rotation of the vertical shaft would cause the turn-table to be turned by the power of the wind-wheel, but as the bevel-wheel T and its spur-wheel V are interposed between the bevel-wheel U, on the shaft C of the wind-wheel, and the spur-wheel W, on the driving-shaft S, it follows that the resistance of the one balances the force of the other, so that the turn-table is free to be turned by the action of the wind on the vane B to keep the wind-wheel to the wind.

A hub or disk is fitted and feathered to slide on the outer end of the shaft C, and to turn with it, and between the hub E and a fixed collar, *e*, on the shaft a coiled spring, F, is interposed, the tension of which tends to keep the hub E against any suitable collar or shoulder on the outer end of the shaft. Radial arms I project from the said hub E, and these arms are connected by oblique braces M to a sliding collar, N, that slides freely on the shaft C. On the said radial arms I are mounted the sails K, by suitable collars L and H, free to slide and turn on the said arms. The collars L are formed with an oblique slot, *c*, which slides on a pin. *x*, projecting from the arms I, so that when the sails slide in or out on the arms the sails are turned from the plane of motion of the wind-wheel by reason of the obliquity of the slots *c* in the outer collars L. The collars H are connected by oblique connecting-rods *a* with the fixed collar D on the shaft, so that when the pressure of the wind against the surface of the sails is sufficient to overcome the tension of the coiled spring F, the entire wind-wheel is caused to slide inward on the shaft C, and by reason of the connection of the sliding collars H of the sails with the fixed collar D on the shaft by the oblique connecting-rods *a*, the sails are forced outward on the radial arms I, and as they move outward they are caused to turn on the arms by the sliding of the oblique slots *c* of collars L, thereby increasing the angle of the face of the sails to the plane of their revolution.

And it will be seen also that as the velocity of the wind-wheel is increased, the sails acting as movable weights are forced to slide outward by centrifugal force, and thereby to increase the obliquity of their surface to the plane of their revolution, thereby taking them more out of the wind, so as to reduce the velocity.

Instead of the spring F for resisting the inward motion of the hub E by the pressure of the wind, a weight, P, may be employed. This weight may be suspended by a cord to an oblique rod, Q, one end of which is forked to embrace a vertical rod, and provided with a roller, R, that bears against the said rod; the other end is forked to embrace a collar, O.

What I claim as my invention, and desire to secure by Letters Patent, is—

1. The arrangement of the weights on the wind-wheel, substantially as described, so that their position on the wind-wheel shall be affected by centrifugal force, in combination with hinged sails, substantially as described, and for the purposes specified, so that the inclination of the sails relatively to the direction of the wind shall be increased by the increased velocity of the wind-wheel.

2. In combination with the weights connected with the sails to shift their inclination by centrifugal force, the means substantially as described for shifting the inclination of the sails by the direct pressure of the wind, as set forth.

3. The arrangement of the gearing for communicating motion from the wind-wheel shaft to the driving-shaft by interposed reversing cog-wheels, substantially as described, in combination with the turn-table, or equivalent, and the vane for holding the wind-wheel to the wind, as set forth.

4. A weight or its equivalent in combination with and to resist the centrifugal action of the weights which shift the inclination of the sails, substantially as described.

A. P. BROWN.

Witnesses:
WM. H. BISHOP,
EDWARD C. REEHILL.